US008799769B2

(12) United States Patent
Liang

(10) Patent No.: US 8,799,769 B2
(45) Date of Patent: Aug. 5, 2014

(54) APPLICATION ABOVE-THE-FOLD RENDERING MEASUREMENTS

(75) Inventor: Yubin Liang, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 369 days.

(21) Appl. No.: 13/023,221

(22) Filed: Feb. 8, 2011

(65) Prior Publication Data

US 2012/0204094 A1    Aug. 9, 2012

(51) Int. Cl.
*G06F 17/00* (2006.01)
*G06F 11/34* (2006.01)

(52) U.S. Cl.
CPC ........ *G06F 11/3419* (2013.01); *G06F 11/3495* (2013.01); *G06F 2201/875* (2013.01)
USPC ............................ 715/234; 715/226; 715/227

(58) Field of Classification Search
CPC ............ G06F 11/3419; G06F 11/3495; G06F 2201/875
USPC ......................................... 715/227, 234, 226
See application file for complete search history.

(56) References Cited

U.S. PATENT DOCUMENTS

| 6,046,820 | A  | * | 4/2000  | Konishi ......................... 358/1.9 |
| 8,233,041 | B2 | * | 7/2012  | Ikeda et al. .................... 348/129 |
| 8,245,130 | B1 | * | 8/2012  | Lloyd et al. .................... 715/238 |
| 8,259,313 | B2 | * | 9/2012  | Imai .............................. 358/1.11 |
| 2002/0015042 | A1 | * | 2/2002 | Robotham et al. ............ 345/581 |
| 2002/0161794 | A1 | * | 10/2002 | Dutta et al. .................... 707/500 |
| 2004/0041820 | A1 | * | 3/2004 | Sevigny ......................... 345/619 |
| 2004/0239681 | A1 | * | 12/2004 | Robotham et al. ............ 345/581 |
| 2006/0034582 | A1 | * | 2/2006 | Hu .................................... 386/46 |
| 2006/0119874 | A1 | * | 6/2006 | Kurihara ....................... 358/1.13 |
| 2007/0118640 | A1 | * | 5/2007 | Subramanian et al. ....... 709/224 |
| 2007/0245339 | A1 | * | 10/2007 | Bauman et al. ............... 717/174 |
| 2007/0260413 | A1 | * | 11/2007 | Ehbets et al. ................. 702/104 |
| 2008/0109250 | A1 | * | 5/2008 | Walker et al. ..................... 705/2 |
| 2008/0114875 | A1 | * | 5/2008 | Anastas et al. ................ 709/224 |
| 2008/0117288 | A1 | * | 5/2008 | Park ............................... 348/36 |
| 2008/0226136 | A1 | * | 9/2008 | Takaku et al. ................. 382/115 |
| 2008/0260204 | A1 | * | 10/2008 | Lee et al. ...................... 382/100 |
| 2009/0031227 | A1 | * | 1/2009 | Chakrabarti et al. ......... 715/763 |
| 2009/0110289 | A1 | * | 4/2009 | Maggiore et al. ............. 382/195 |
| 2009/0244277 | A1 | * | 10/2009 | Nagashima et al. .......... 348/135 |
| 2009/0300151 | A1 | * | 12/2009 | Friedman et al. ............. 709/222 |
| 2009/0327854 | A1 | * | 12/2009 | Chhajer et al. ................ 715/227 |
| 2010/0066559 | A1 | * | 3/2010 | Judelson .................. 340/825.49 |
| 2010/0226541 | A1 | * | 9/2010 | Kobayashi et al. ............ 382/106 |
| 2011/0029393 | A1 | * | 2/2011 | Apprendi et al. .......... 705/14.73 |
| 2011/0055023 | A1 | * | 3/2011 | McNeeley et al. ......... 705/14.72 |
| 2011/0211065 | A1 | * | 9/2011 | Furui ............................. 348/135 |
| 2011/0314343 | A1 | * | 12/2011 | Hoke et al. ...................... 714/45 |

(Continued)

*Primary Examiner* — Stephen Hong
*Assistant Examiner* — Marshon Robinson
(74) *Attorney, Agent, or Firm* — Schwegman, Lundberg & Woessner, P.A.

(57) ABSTRACT

Various embodiments include a method and system for application above-the-fold rendering measurements. A start time corresponding to a rendering operation of an application may be recorded. A series of bitmaps of a portion of a rendering canvas representing above-the-fold data for the application may be captured. The first of the series of bitmaps may be captured at the start time and successive captured bitmaps each captured after a specified time interval from a previously captured bitmap. Each bitmap in the series of bitmaps may then be processed to create a corresponding measurement image, and the measurement images may be compared to determine an end time.

19 Claims, 6 Drawing Sheets

(56) References Cited

U.S. PATENT DOCUMENTS

2012/0066586 A1* 3/2012 Shemesh .................. 715/235
2012/0194519 A1* 8/2012 Bissell et al. ............. 345/428
2012/0226972 A1* 9/2012 Fainberg et al. .......... 715/234
2012/0311438 A1* 12/2012 Cranfill et al. ............ 715/256

* cited by examiner

405-TIME: 0 MS

410-TIME: 60 MS

415-TIME: 120 MS

420-TIME: 180 MS

425-TIME: 240 MS

430-TIME: 1,240 MS

APPLICATION ABOVE-THE-FOLD RENDERING MEASUREMENTS

TECHNICAL FIELD

This document pertains generally to data processing techniques, and more particularly, but not by way of limitation, to above-the-fold ("ATF") rendering measurements for computer applications.

BACKGROUND

As companies rely more on websites and web applications to reach consumers, increasing the quality of user experiences with those websites has become important. Part of the user experience is the responsiveness, or performance, of the website. It has been understood for some time that a user's perception of a website's performance is directly tied to the time between requesting a web page and when the user believes the page to be loaded and usable.

Web browsers, or simply browsers, often make the request for a web page and then download and render the content from a company's web servers. Currently there area variety of browsers, each with a variety of rendering engines; where a rendering engine generally accepts some input to create graphical output on a display, such as a computer or smartphone screen. A browser may include a rendering engine for Hypertext Markup Language ("HTML"), one or more engines for a variety of scripting languages (e.g., Javascript), and possibly engines for other browser integrated technologies (e.g., Adobe® Systems Inc. Flash®). Different rendering engines may or may not conform to a technology specification, and may perform the rendering (or interpreting in the case of script languages) steps in different orders or in different ways.

Currently, measuring the response times of web pages in a browser involves measuring the time from a web page request to a content server to a browser based event during the rendering of the web page. These events typically include when elements, or the entirety of the content, are downloaded from the network, when an object in the page is rendered, or when a script may be run. Using scripts to measure the response time of a web page often involves placing timing scripts throughout the web page, the timing scripts recording a time when the scripts are run by the browser.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Current techniques to measure web page response times suffer from several drawbacks. First, using the difference between the time content is requested and the time content is downloaded to a browser, while easy to measure, does not indicate how long it takes for that content to be graphically rendered to the user such that the user perceives the web page as usable. This may be due to the varying ways different browsers render received content, it may be due to the ability for scripts to the rendered content while the content is being displayed, or other particularities of a user's browsers environment. Second, also often due to the differing behavior of different browsers, different script engines, or possibly third party software (e.g., browser "plugins"), using scripts to measure the response time of web pages is unreliable because the time during the loading and rendering of the web page when a given script is executed may vary considerably. Third, because the single most important factor in a user's experience is the ATF rendering time and the portion of a webpage actually visible to the user may be hidden from the metrics generally available (e.g., via script) to a third party browser.

Measuring the ATF rendering response of a web page by capturing screen shots, or a bitmap representation of the displayed image of a web page, overcomes the limitations of current web page response time measuring techniques. That is, measuring the time between the browser requests content and simply observing the visible pixels rendered to a display avoids the differences between browsers by focusing on the user's experience. Successively capturing bitmaps representing screen shots of the browser after the web page content is requested provides information on the state of the rendered web page over time. Comparing differences between successively captured bitmaps permits the determination of when the rendered web page has stopped changing, or settled, and thus permits a determination of an end time for the ATF the measurement (the initial web page request being the start time). By using this technique, companies may now accurately measure the ATF rendering time and thus the user's perceived responsiveness of a web page. Accurate ATF measurement now allows companies to assess user experience impacts from, for example, planned web page changes to adjust plans in order to maintain acceptable user experience standards.

Figure 1:
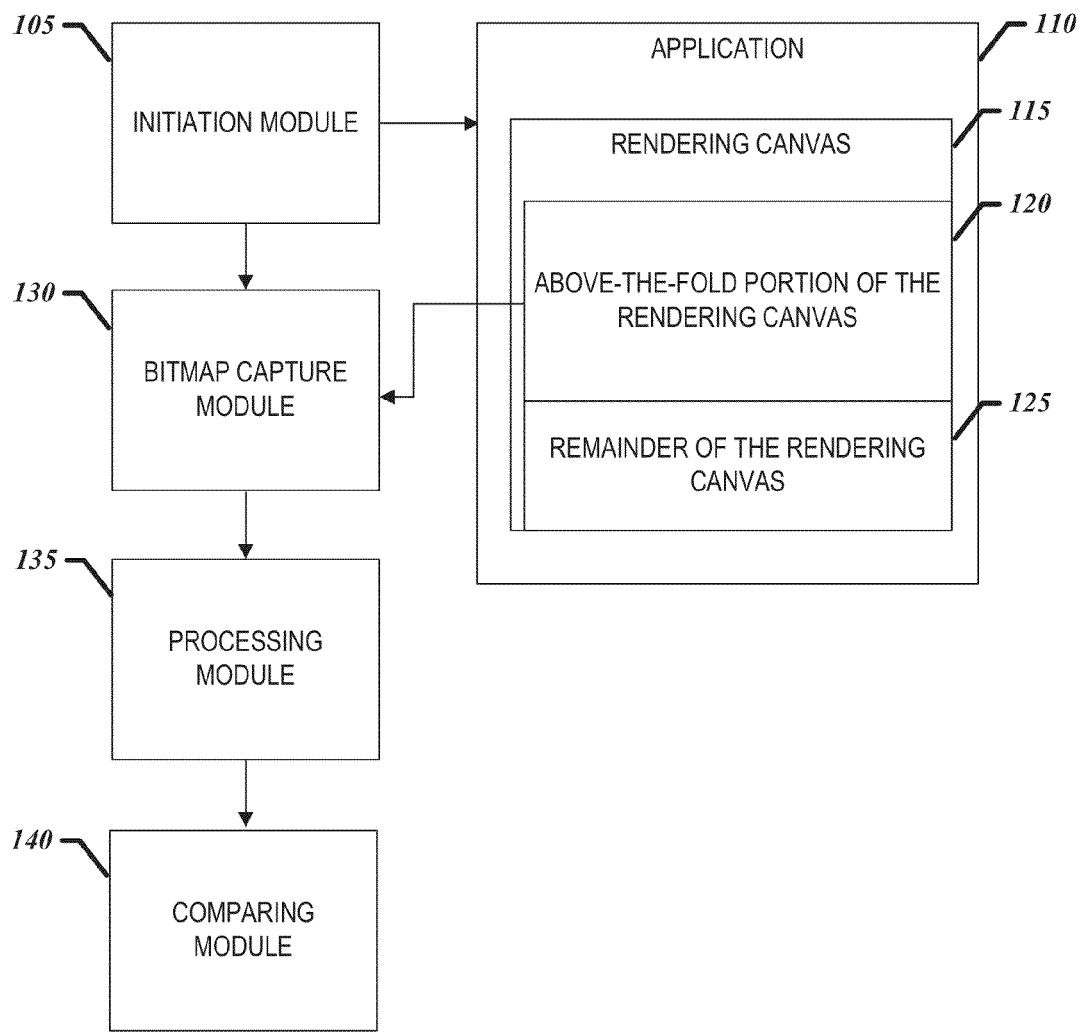
FIG. 1 is a block diagram illustrating an example system for application ATF rendering measurements, according to one embodiment.

FIG. 1 is a block diagram illustrating an example system 100 for application ATF rendering measurements, according to one embodiment. System 100 may include an initiation module 105, an application 110 (e.g., a browser), a bitmap capture module 130, a processing module 135, and a comparing module 140. Application 110 may additionally contain a rendering canvas 115 that may be subdivided into an ATF portion of the rendering canvas 120 and the remainder of the rendering canvas 125.

Initiation module 105 may be software running on computer hardware, such as one or more processors, and configured to capture a start time that corresponds to a rendering operation of an application 110. In some examples, to record a start time includes requesting a web page. For example, the initiation module 105 may initiate a browser web page request and record the time the request is made. In this example, the rendering operation is the complete lifecycle of a web page request and the rendering of the web page to a display. In some examples, a rendering operation may include different trigger events that end in some graphical representation being rendered to a display, such as the time between a graphical user interface ("GUI") element's (e.g., a button) activation and the subsequent updating of a user interface. Thus, any measurable event culminating in a change in a graphical display is contemplated as a rendering operation of application 110. In some examples, the initiation module 105 may initiate the rendering operation itself. In some examples, the initiation module 105 receives notification that the rendering operation has commenced. In some examples, the notification includes a time stamp indicating the start time. In some examples, the start time is an initial value as opposed to an indication of time, such as zero. When such an initial value is used, the subsequent time measurements may be inferred from, for example, a constant capture rate of bitmaps and the index of a given bitmap relative to the initial value. For example, if the start time is zero, and bitmaps are captured one second apart, subtracting the fourth bitmap's index of four from zero and multiplying it by the capture interval will yield a four second interval between the start time and the fourth bitmap. It will be understood that several representations of the start time are possible as long as each allows for a time to be derived from the start time and an end time which is discussed below with respect to comparing module 140.

Application 110 may be a browser, or other computer application capable of rendering visual content to a computer display, such as a monitor, smartphone screen, etc. It will be understood that Application 110 will not generally render visual content directly to the physical visual elements of a display, but rather renders the visual information to a memory buffer called a canvas, represented in FIG. 1 as rendering canvas 115. Rendering canvas 115 may be a buffer in memory space of Application 110, a buffer in the graphical environment's memory space (e.g., the window manager of an operating system, or driver for the display), or a buffer on the display itself.

Figure 2:
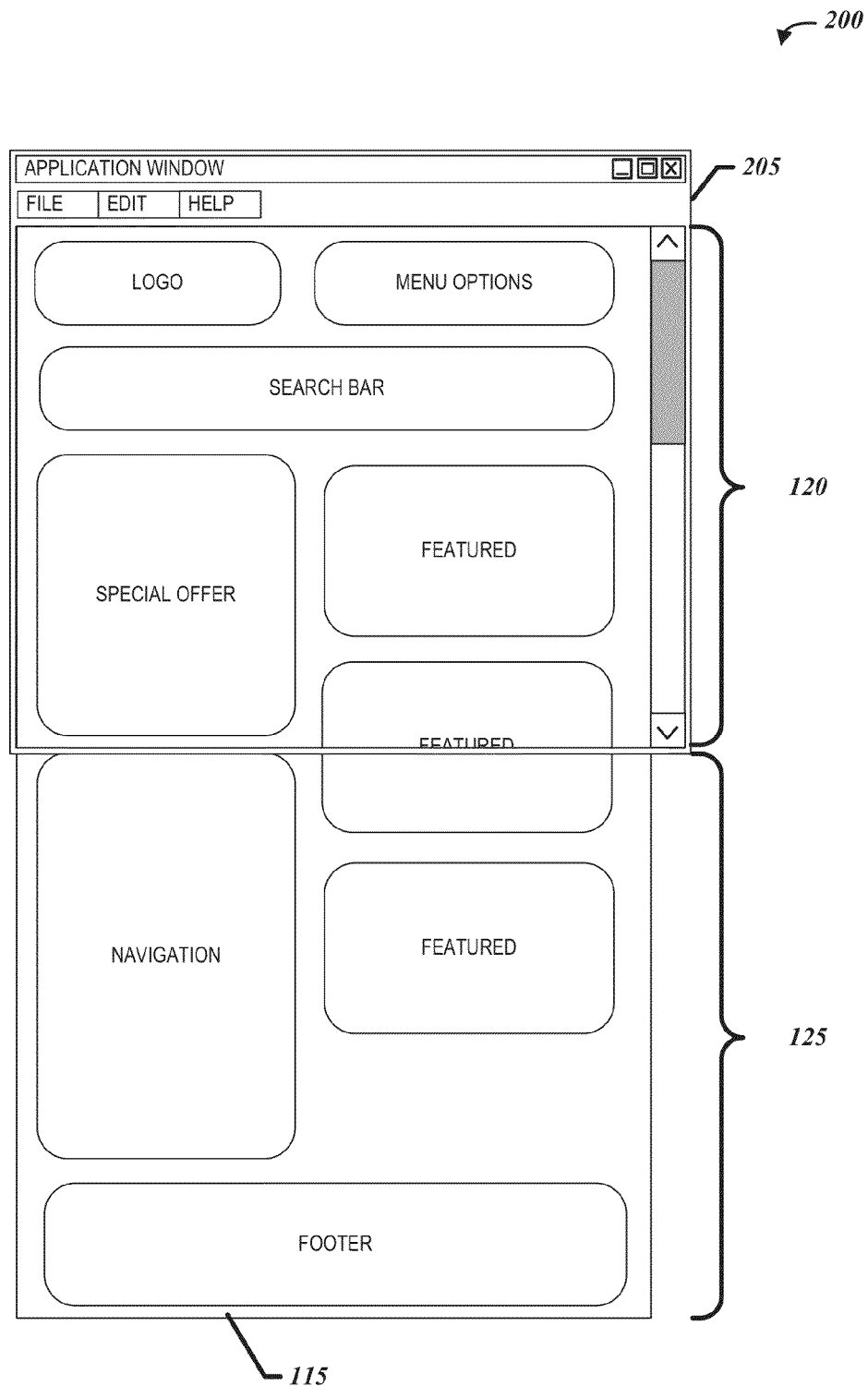
FIG. 2 is a diagram of an example rendered webpage and an application window illustrating an ATF portion of a rendering canvas, according to one embodiment.

Rendering canvas 115 may be further subdivided into an ATF portion of the rendering canvas 120 ("ATF Portion") and a remainder of the rendering canvas 125 ("Remainder Portion"). In some examples, ATF Portion 120 data corresponds to pixels rendered onto the display. The ATF Portion 120 includes visual content that may be observed by a user without manipulating the GUI. For example, if a web page is displayed on the screen, but is larger than the screen, modern GUI's will typically include a scroll bar element allowing the user to scroll to the portions of the web page that are not initially visible to the user; the ATF Portion 120 is the portion of the web page visible to the user without using the scroll bar. FIG. 2 is a diagram of an example rendered webpage 200 (the webpage content within rendering canvas 115) and an application window 205 showing ATF Portion 120, Remainder Portion 125 according to this example.

Application 110 generally renders the visual content to the rendering canvas 115 without concern for what portion of the visual content is in the ATF Portion 120 or the Remainder Portion 125 because visual environments (e.g., screen size and resolution) may vary widely. However, several techniques for determining the content (i.e., the actual pixels) in the ATF Portion 120 may be used to identify the ATF Portion 120 from the Remainder Portion 125. For example, an operating system in which Application 110 may provide the Application with screen geometries and characteristics allowing Application 110 to determine the ATF Portion 120. Further, a windowing system of the operating system may clip, or remove, the Remainder Portion 125 when it is displayed, thus keeping only the ATF portion 120 in rendering canvas 115; this being more likely true if rendering canvas 115 is a buffer of the graphical environment as noted above. Further, if the rendering canvas 115 is a buffer of the display itself, then it likely contains only the visual information currently displayed to a user and thus only correspond to the ATF Portion 120.

Bitmap capture module 130 may be configured to capture a series of bitmaps of a portion of application's 110 rendering canvas 115 that represents ATF data (i.e., ATF Portion 120). A bitmap will be understood to be a representation of a graphic, stored in memory, on disk, etc., as a two-dimensional grid with each position in the grid representing a pixel. The captured bitmap will thus have a position for each pixel in ATF Portion 120, with each position including information about a pixel, such as color, luminance, etc. It will be understood that a copy of a buffer containing rendering canvas 115 will comprise the visual information of the bitmap. Bitmap capture module 130 may access ATF Portion 120 via any number of mechanisms, including via application program interface ("API") calls to application 110, to the graphical environment (e.g., operating system or window manager), or directly to the display. After accessing ATF Portion 120, bitmap capture module 130 may store the bitmap, for example, on a hard disk.

Bitmap capture module 130 may capture the first in a series of bitmaps at the start time and successive bitmaps after a specified time interval from a previously captured bitmap. In some examples, the initiation module 105 may invoke the bitmap capture module 130. In some examples, the bitmap capture module 130 may observe the recordation of the start time and capture the first bitmap when the observation is made. In some examples, the captured bitmaps are indexed according to the order in which they are captured (e.g., the first bitmap receives an index of one, the second an index of two, etc.). In some examples, to capture the series of bitmaps includes associating a timestamp with each bitmap as it is captured. In some examples, the specified time interval is constant while bitmaps are captured. In some examples, the specified time interval from a previously captured bitmap is sixty milliseconds. In some examples, the specified interval is not constant between successively captured bitmaps. This may be advantageous to reduce the total number of captured bitmaps when it unlikely that rendering has completed (e.g., at the beginning of the capture process). Bitmap capture module 130 may continue to capture bitmaps until a predetermined condition is met, it is instructed to stop (e.g., by the comparing module 140), or when it is made aware that an end time has been determined. In some examples, the predetermined condition may be notification that the application 110 has completed rendering (e.g., a browser has completely rendered a webpage) or other defined application 110 events (e.g., a phase in the rendering cycle has passed). In some examples, the predetermined condition may be the passing of a time limit (e.g., capturing starts at a first time and ends after a specified interval). In some examples, no other module (e.g., the processing module 135 or comparing module 140) is running white the bitmap capture module 130 is capturing bitmaps so as not to cause side effects in the rendering operation of application 110.

Processing module 135 may be configured to process each captured bitmap in the series of bitmaps to create a measurement image. That is, in order to facilitate automatic (i.e., without human intervention) comparison of bitmaps to determine when the ATF content is done rendering, the bitmaps may transformed in memory or on disk) to another form that makes differentiation between two bitmaps easier to observe.

In some examples, to process each bitmap in the series of bitmaps includes compressing each bitmap to create the corresponding measurement image. In some examples, compressing each bitmap includes converting a bitmap into a JPEG image (JPEG being a family of image compression standards from the Joint Photographic Experts Group). Because image compression generally relies on identifying similar areas within an image (e.g., pixel runs of the same color or indexing the prevalence of colors within the image), the level of compression (or resulting file size) may vary depending upon the content being compressed. Thus, similar visual content of images may be assumed when the compress file size approaches equality. In some examples, other forms of processing may be used to convert a bitmap into a measurement image, such as aggregating pixels of the same color found in the bitmap in an order which may allow simple pixel comparisons between two images, the comparison terminating after an incongruity is discovered, or other method of converting the bitmap to facilitate machine recognition of similarities between two images. In some examples, the measurement image may no longer represent a visual depiction of an image (i.e., it cannot be displayed such that it is recognizable to a user as the same image as the bitmap), but rather a representation of one or more aspects, or metrics, of the bitmap. For example, the measurement image may simply be a table with a color in the first column and the number of pixels corresponding to the color in the second column.

Figure 3:
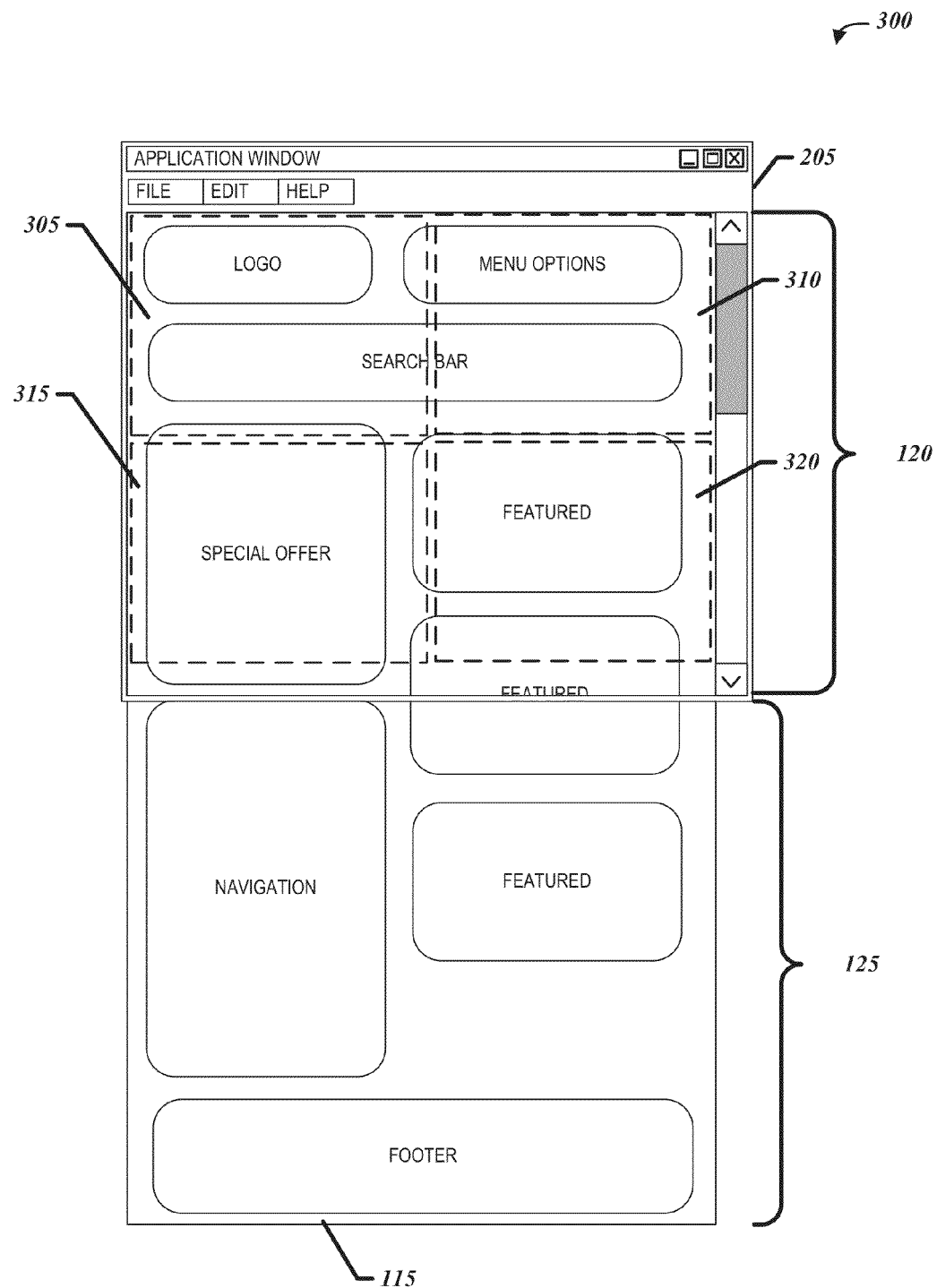
FIG. 3 is a diagram of an example rendered webpage and an application window illustrating a partitioned ATF portion of a rendering canvas, according to one embodiment.

In some examples, the bitmap may be subdivided into regions as part of the processing, where each region may be treated as a separate bitmap associated with the region. FIG. 3 is a diagram of this example where a rendered webpage 300 and an application window 205 illustrate a partitioned ATF Portion 120, where rendering canvas 115 and Remainder Portion 125 are as previously described with respect to FIG. 2. Here, ATF Portion 120 is portioned into equal quarters by partitions 305-320. In this example, partitions 305-320 may each be derived from the bitmap and treated as separate measurement images to be compared with subsequent measurement images corresponding to the same partition. For example, partition 305 may be compressed into a JPEG file and associated with the time of the bitmap capture and later compared with a subsequent measurement image derived from a bitmap with a later capture time associated with the pixel geometry of partition 305 (e.g., the upper right quadrant of ATF Portion 120). Partitioning may not result in equal partitions, however, and may be flexible. For example, a single partition may be used to represent the upper portion of web page 300, including the "Logo", "Menu Options", and "Search Bar" elements of web page 300. Varying partition size and shape may allow for more accurate estimation of rendering response time based on for knowledge of the structure of web page 300.

Comparing module 140 may be configured to compare measurement images to determine an end time. In some examples, to compare the measurement images to determine an end time may include locating a first measurement image that is equal in at least one measurement to a group of successive measurement images, the end time being a time associated with the first measurement image and the group of successive measurement images including all measurement images within a predefined period of time following the first measurement image. In some examples the predefined period of time may be one second. In some examples, the at least one measurement is a size of the measurement images. For example, as measurement images are produced, the comparing module 140 may note a current size for a measurement image as one kilo byte ("KB"). The comparing module may then compare a second measurement image to the current size to determine if it is also equal to one KB. When successive measurement images reflect the same size (or within a threshold such as five bytes for example) for the (predetermined period of time (e.g., one second), the comparing module 140 ceases comparing the measurement images and records the time of the first image to reflect the final size as the end time. In this example, the predefined period allows for a reasonable time for the rendering to settle, or become stable, and thus avoid indicating an end time where there is a momentary pause in the rendering at some point prior to completion of the rendering. In some examples, the end time may be determined by a timestamp associated with the first measurement image that is equal in at least one measurement to a group of successive measurement images. In some examples, the end time may be derived from the index of the first measurement image that is equal in at least one measurement to a group of successive measurement images respective to the start time and the specified time interval between captured bitmaps associated with the measurement images.

As briefly noted in previous discussions, ways to compare measurement images, other than comparing file sizes of measurement images created by compressing bitmaps may be utilized. However, each measurement that is compared should alone, or in aggregate if more than one measurement is utilized, be equal (or near equal) between measurement images representing the same visual information in the corresponding bitmaps. That is, when a user perceives that the rendering has completed (e.g., there are no more visual changes to ATF Portion 120), the measurement images created from bitmaps sampled during and after this time period should be equal in the chosen measurement (e.g., file size of compressed bitmap). Although the term "file size" is used, one will appreciate that this term includes the size in bytes of the image after compression whether it is stored in a file on a disk, or resident in system memory.

Although FIG. 1 shows the initiation module 105, application 110, bitmap capture module 130, processing module 135, and comparing module 140 as separate and distinct components, it will be understood that the components may be combined in various ways. For example, the modules 105 and 130-140 may be part of a software addition to application 110, such as a browser plugin. Additionally, application 110 is included to more clearly demonstrate the relationship between the initiation module 105 and a rendering operation of application 110 via the start time, as well as the relationship between the bitmap capture module 130 and the rendering canvas 115 and more specifically the ATF Portion 120. That is, application 110 is not necessary for system 100 to operate as long as the initiation module obtains the start time (e.g., the initiation module 105 receives the start time) and the bitmap capture module 130 has access to the ATF Portion 120 to capture the bitmaps (e.g., by directly accessing the buffer for the display or a buffer of the graphical environment). It will also be understood that the modules 105 and 130-140 may be composed of software executing on one or more computers (e.g., on one or more processors of the one or more computers), hardware, or both.

After determining the start time and end time, one may easily measure the ATF response time for the rendering operation of application 110. For example, if the start time and end time are represented as time (e.g., by a timestamp) then simply subtracting the start time from the end time will yield the ATF response time. If, for example, the start time is an index of zero, and the end time is an index of five—the end time index corresponding to the index of the first measurement image that is equal in at least one measurement to a group of successive measurement images—then the start time may be subtracted from the end time and multiplied by the previously specified time interval between bitmap captures (e.g., one millisecond) to arrive at a response time of five milliseconds assuming that the specified time interval is constant.

Figure 4:
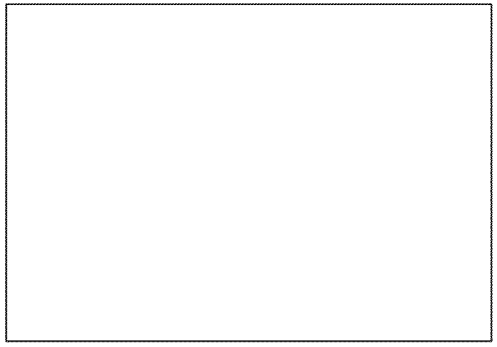
FIG. 4 illustrates an example user interface including captured images, according to one embodiment.
Figure 4:
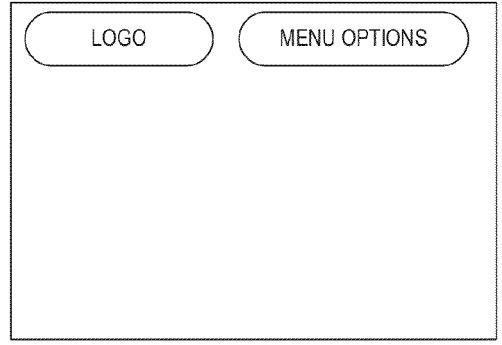
Figure 4:
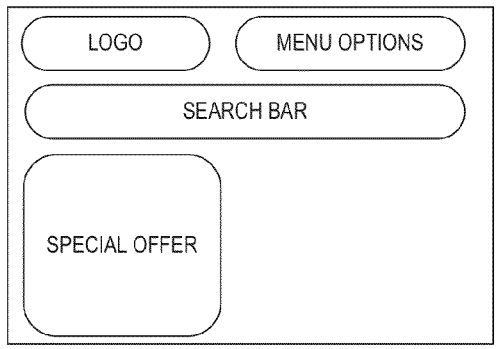
Figure 4:
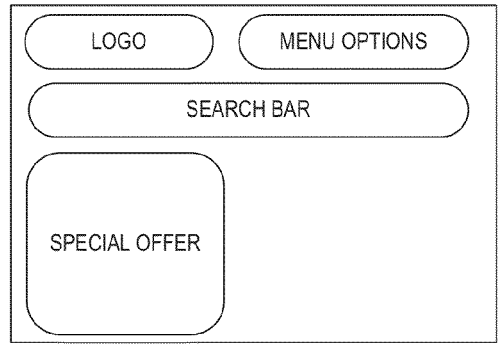
Figure 4:
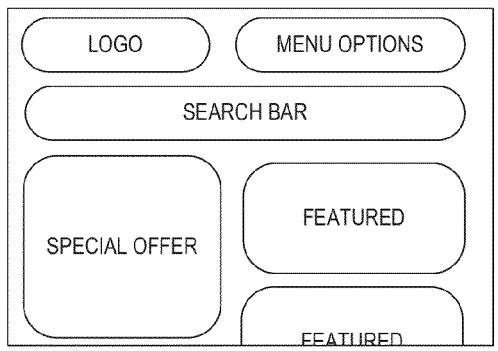
Figure 4:
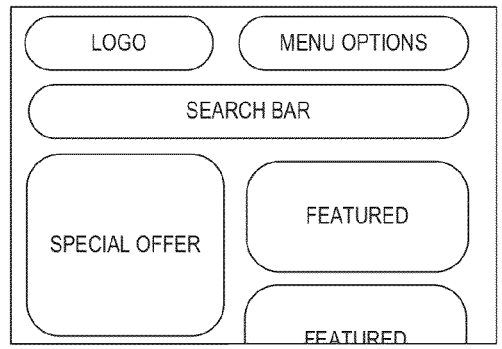

After arriving at a time based interval between the start time and the end time, the response time for the rendering operation may be viewed in a user interface, or exported to another application for reporting, or other purposes. Further, the captured bitmaps, or corresponding measurement images, may be retained, along with any additional information (e.g., image index, associated timestamp, browser type or version, etc.) for later viewing. In some examples, the images may be displayed in a user interface, in order, to allow a user to determine what parts of the web page appear to contribute to the rendering response time. FIG. 4 illustrates such a visual representation 400 with images 405-430 including both the visual information from the captured bitmaps as well as the associated timing information. Note that FIG. 4 also demonstrates the usefulness of a settling time to determine the end time (as discussed above with respect to the comparing module 130 of FIG. 1) as images 415 and 420 show the same visual information but for a limited time while images 425 and 430 show the same information for a much longer time. For example, in modern commercial websites, advertisements or other third party content may take significantly longer to display. If after content is added to a web page, the response time of the web page is longer than it was before (e.g., as possibly indicated by a reduced response time exceeding a predetermined threshold), the user interface may alert a user and provide a slide show, or other temporal representation of the captured images so that the user may visually identify a, for example, problem advertisement. Also, partitioning ATF Portion 120 as previously described with respect to FIG. 3, users may be immediately directed to areas of the web page which load more slowly. For example, if partition 305 loads more slowly than it has in the past, a user may simply need to identify the content rendered into partition 305 to determine the problem. If the partitions are tailored to cover specific content areas (e.g., the "Search Bar" shown in FIG. 3), then a user may not even have to consult the underlying images 405-430, but simply investigate the components associated with a particular partition. However, whether the whole ATF response time is measured, or ATF Portion 120 partitions, companies may use the rendering response time information to be able to quickly identify underperforming web pages and also receive the valuable contextual information (e.g., images 405-403) to engineers so that problems may be resolved.

Figure 5:
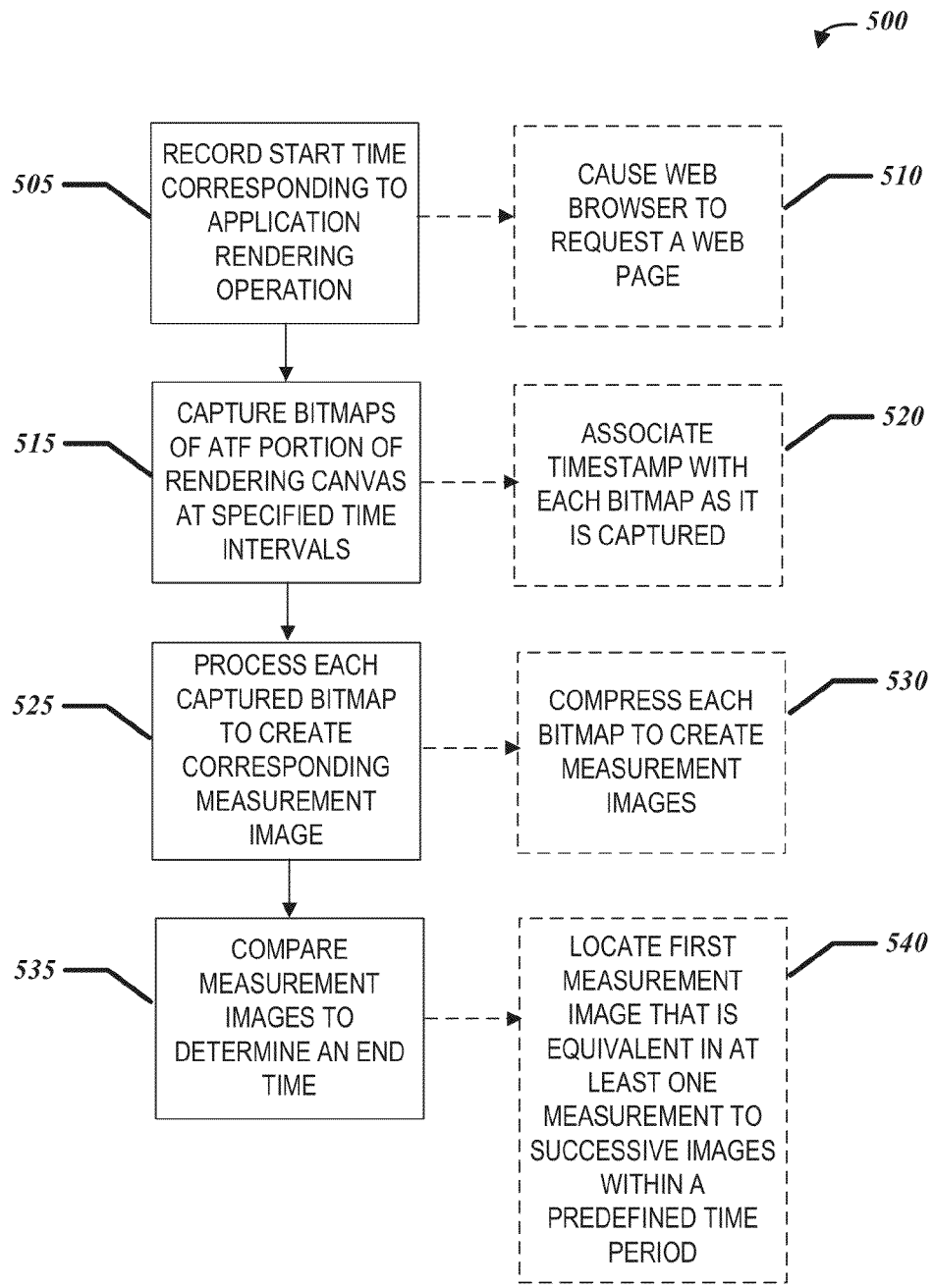
FIG. 5 is a flowchart illustrating an example method of application ATF rendering measurement, according to one embodiment.

FIG. 5 is a flowchart illustrating an example method 500 of application ATF rendering measurement according to one embodiment. Although one or more components shown in FIGS. 1-4 are described below as performing portions of method 500, it will be understood that different combinations of those components, or different components altogether, may be used in any number of combinations to practice method 500. Portions of method 500 that involve the capturing, storing, and manipulation of data transform the contents of system memory (e.g., RAM) or system storage (e.g., hard disk, Flash memory, etc.). Further, each operation not specifically described as performed by a human involves executing software on one or more processors of one or more computers.

At 505 a start time corresponding to a rendering operation of an application 110 of FIG. 1 may be recorded. Application 110 may be any computer application which renders content to a display for users. A rendering operation for application 110 may be any cycle beginning with an event in application 110 and ending in a visual change to a display. In some examples, the visual change to the display is complete; i.e., the display will not be further updated based solely on the triggering event. In some examples, the triggering event could be the receipt of user input, the receipt of data from another sources (e.g., a network communication), the passing of time from a previous event, etc. In some examples, the start time is universal time, as represented in the system clock. In some examples, the start time is specific to the context of the operating environment in which method 500 is executing, such as an offset from the last system start. In some examples, the start time is an index as previously described with respect to FIG. 1.

At 510 recording the start time may optionally include requesting a web page when the application is a web browser. For example, using the initiation module 105 of FIG. 1, or some other component, application 110 may be instructed to request a web page and the start time recorded when the request is made. This may allow for greater synchronization between the beginning of the rendering operation and the start time to measure rendering response times to a greater resolution, or to account for particularly short rendering operation lifecycles. In some examples, the initiation module 105 may initiate other trigger events, such as requesting an image, an embedded application, or other browser action resulting updating the visual display. It will be understood that initiating the trigger event when the start time is recorded is also applicable to applications that are not browsers as well.

At 515 a series of bitmaps of a portion of a rendering canvas representing ATF data for the application may be captured. The first captured bitmap being captured at the start time and successive captured bitmaps each captured after a specified time interval from a previously captured bitmap. In some examples, the specified time interval is sixty milliseconds. The previous discussion concerning ATF Portion 120 with respect to FIGS. 1-3 is equally applicable here. The capturing of the bitmaps is also evident in user interface 400 shown in FIG. 4, where the start time is zero milliseconds, and bitmaps are captured at sixty millisecond intervals. In some examples, the captured bitmaps are placed in a filesystem with meta data encoded into the filename. For example, a file name of "scrnshot_9_667_34.jpg" may mean that the bitmap is the ninth screen capture after six hundred sixty-seven milliseconds since the start time (here represented as zero milliseconds) and took thirty-four milliseconds to capture the screen (considered overhead and generally excluded from the measurement).

At 520 capturing the series of bitmaps optionally includes associating a timestamp with each bitmap when it is captured. Associating a timestamp may provide accurate timing information even if processing delay cause the capture of a bitmap to be outside the specified time interval. For example, if the specified time interval is one millisecond, and the fifth captured bitmap is not captured until 1.5 milliseconds after the fourth captured bitmap, associating the time stamp will allow for correction and/or reporting of the discrepancy; whereas as simply multiplying the index of capture (i.e., five for the fifth captured bitmap) with the specified interval will not address such issues.

At 525 each bitmap in the series of bitmaps may be processed to create a corresponding measurement image. In some examples, a measurement image may be both modified to facilitate computer based comparisons between measurement images and also be rendered to a display such that a user recognizes the image as the corresponding captured bitmap.

Such measurement images may be the bitmap with additional meta data included computed metrics of the bitmap (e.g., an index of colors in the bitmap and associated pixel counts), or may be another image format. In some examples, the measurement image may not be rendered to a display, but contain the comparison information (e.g., the previously described meta data without the associated captured bitmap). Such measurement images may be more efficient from a storage perspective, and also unnecessary if a smart bitmap partitioning scheme is utilized as previously described with respect to FIGS. 1 and 3.

At 530 processing each bitmap in the series of bitmaps optionally includes compressing each bitmap to create the corresponding measurement image. In some examples, compressing each bitmap includes converting the bitmap into a JPEG image. Image compression schemes generally attempt to identify data areas that are the same, organize those areas in terms of size, and then efficiently represent the areas in order from largest to smallest. This process conveniently results in varying image sizes that are generally tied to the content of the uncompressed bitmap. Thus, two compressed images of the same size may be considered to contain the same visual content. While circumstances exist where this may not be true—examples may include images that are identical except for differing color values like a photo and its negative and noisy images such as confetti—in the context of application content rendering like most commercial web pages, generally two compressed images of the same size represent the same visual data.

At 535 measurement images may be compared to determine an end time. As the measurement images are captured, they may be stored and compared in batch, or compared in real-time. The measurement images are generally compared sequentially until an image is found that represents the end time, or the completion of the rendering operation. In some examples, a measurement image is compared with only one other measurement image at a time. In some examples, where the captured bitmaps are partitioned (e.g., as previously described with respect to FIG. 3), a measurement image is compared only to other measurement images associated with the same partition (e.g., partition 320). In some examples, the measurement image that represents the end time may be the first measurement image found that corresponds to the bitmap representing the completed rendering operation. For example, assuming that the completed rendering operation results in the image of a face, the measurement image representing the end time corresponds to the captured bitmap of the completed face.

At 540 comparing the measurement images to determine an end time optionally includes locating a first measurement image that is equivalent in at least one measurement to a group of successive measurement images, the end time being a time associated with the first measurement image and the group of successive measurement images including all measurement images within a predefined period of time following the first measurement image. The process of observing the approach of a final rendering to the display may be thought of as settling, where the rendered visual data is completely settled when it stops changing. In some examples, measurement images are compared after a measurement image that is a candidate for the end time image for a predefined time, or settling, period to help ensure no more changes to the visual data are forthcoming. In some examples, the predefined period of time is one second. In some examples, the at least one measurement is a size of the measurement images. In some examples the at least one measurement is the number of pixels associated with a particular color. In some examples, a plurality of measurements are used to compare the measurement images. However measurement images are compared, the measurements capture the similarity of two sets of visual data (e.g., images on the display) to determine when the display has stopped changing. In some examples the measurements between two measurement images need not be identical, but rather within a given threshold. For example, given two JPEG measurement images, a determination that they include no significant differences could be made when they are within one kilo byte of each other.

Companies employing method 500 can now accurately measure the ATF rendering time of applications. Because the ATF rendering time is the most important metric in a user's perception of the responsiveness of the application, companies can now efficiently and automatically analyze applications or content rendering within the applications to understand the impact on user experience due to changes in the application or content. Further, the approaches described above are generally independent of the particular application being observed (e.g., different browsers) and directly measure the visual information to the user. Achieving this close measure of user experience allows companies to increase the quality of their content, in the case of web content providers, or applications and thus increase revenue.

Figure 6:
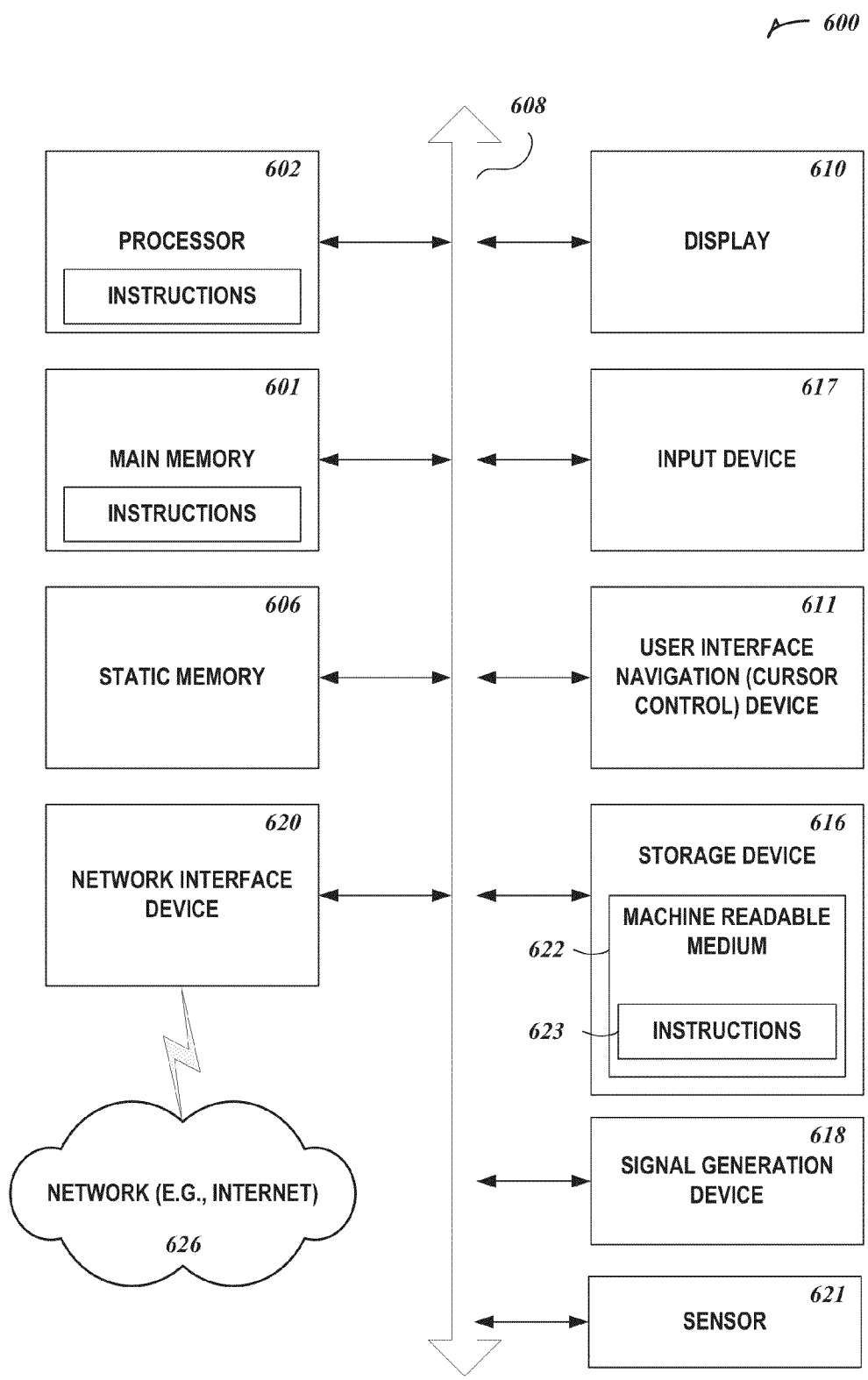
FIG. 6 is a block diagram illustrating an example machine upon which any one or more of the methodologies discussed may be run.

FIG. 6 is a block diagram illustrating an example machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device (e.g., drive unit 616), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting, machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other examples or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:
    recording a start time corresponding to a rendering operation of an application;
    capturing, using one or more processors, a series of bitmaps of a portion of a rendering canvas representing above-the-fold (ATF) data for the application, a first captured bitmap being captured at the start time and successive captured bitmaps each captured after a specified time interval from a previously captured bitmap;
    processing each bitmap in the series of bitmaps to create a corresponding measurement image, the processing including compressing each bitmap to create the corresponding measurement image; and
    comparing measurement images to determine an end time, the comparing including locating a first measurement image that is equivalent in size to a group of successive measurement images, the end time being a time associated with the first measurement image and the group of successive measurement images including all measurement images within a predefined period of time following the first measurement image.

2. The method of claim 1, wherein recording the start time includes requesting a web page, and wherein the application is a web browser.

3. The method of claim 1, wherein capturing the series of bitmaps includes associating a timestamp with each bitmap when it is captured.

4. The method of claim 1, wherein the compressing each bitmap includes converting a bitmap into a JPEG image.

5. The method of claim 1, wherein the predefined period of time is one second.

6. The method of claim 1, wherein the specified time interval is sixty milliseconds.

7. The method of claim 1, wherein the portion of the rendering canvas representing the ATF data corresponds to pixels rendered onto a display.

8. A system including:
a processor;
an initiation module configured to capture a start time that corresponds to a rendering operation of an application;
a bitmap capture module that executes on the processor and is configured to capture a series of bitmaps of a portion of an application's rendering canvas that represents above-the-fold (ATF) data, a first captured bitmap is captured at the start time and successive captured bitmaps are each captured after a specified time interval from a previously captured bitmap;
a processing module configured to process each bitmap in the series of bitmaps to create a measurement image, wherein to process each bitmap in the series of bitmaps includes compressing each bitmap to create a corresponding measurement image; and
a comparing module configured to compare measurement images to determine an end time, wherein to compare the measurement images to determine the end time includes locating a first measurement image that is equivalent in size to a group of successive measurement images, the end time being a time associated with the first measurement image and the group of successive measurement images including all measurement images within a predefined period of time following the first measurement image.

9. The system of claim 8, wherein to record the start time includes requesting a web page, and wherein the application is a web browser.

10. The system of claim 8, wherein to capture the series of bitmaps includes associating a timestamp with each bitmap when it is captured.

11. The system of claim 8, wherein compressing each bitmap includes converting a bitmap into a JPEG image.

12. The system of claim 8, wherein the predefined period of time is one second.

13. The system of claim 8, wherein the specified time interval is one millisecond.

14. The system of claim 8, wherein the portion of a rendering canvas representing the ATF data corresponds to pixels rendered onto a display.

15. A non-transitory machine-readable medium storing instructions that, when executed by at least one processor, cause the at least one processor to perform the following actions:
recording a start time corresponding to a rendering operation of an application;
capturing a series of bitmaps of a portion of a rendering canvas representing above-the-fold (ATF) data for the application, a first captured bitmap being captured at the start time and successive captured bitmaps each captured after a specified time interval from a previously captured bitmap;
processing each bitmap in the series of bitmaps to create a corresponding measurement image, the processing including compressing each bitmap to create the corresponding measurement image; and
comparing measurement images to determine an end time, the comparing including locating a first measurement image that is equivalent in size to a group of successive measurement images, the end time being a time associated with the first measurement image and the group of successive measurement images including all measurement images within a predefined period of time following the first measurement image.

16. The machine-readable medium of claim 15, wherein recording the start time includes requesting a web page, and wherein the application is a web browser.

17. The machine-readable medium of claim 15, wherein capturing the series of bitmaps includes associating a timestamp with each bitmap when it is captured.

18. The machine-readable medium of claim 15, wherein the compressing each bitmap includes converting a bitmap into a JPEG image.

19. The machine-readable medium of claim 15, wherein the portion of the rendering canvas representing the ATF data corresponds to pixels rendered onto a display.

* * * * *